(12) United States Patent
Worral et al.

(10) Patent No.: US 10,417,896 B2
(45) Date of Patent: Sep. 17, 2019

(54) SYSTEM AND METHOD FOR MONITORING PROCEDURE COMPLIANCE

(71) Applicant: Disney Enterprises, Inc., Burbank, CA (US)

(72) Inventors: John David Worral, Clermont, FL (US); Shawn Allen Boling, Davenport, FL (US); Ronald J. Dearing, Jr., Windermere, FL (US); Gregory Brooks Hale, Orlando, FL (US); Scott William Rench, Windermere, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 15/485,896

(22) Filed: Apr. 12, 2017

(65) Prior Publication Data
US 2018/0301014 A1 Oct. 18, 2018

(51) Int. Cl.
G08B 21/24 (2006.01)
G08B 21/04 (2006.01)
G06K 9/00 (2006.01)

(52) U.S. Cl.
CPC ....... G08B 21/245 (2013.01); G06K 9/00355 (2013.01); G08B 21/043 (2013.01)

(58) Field of Classification Search
None
See application file for complete search history.

(56) References Cited

U.S. PATENT DOCUMENTS

| | | | |
|---|---|---|---|
| 9,672,726 B2 * | 6/2017 | Borke | G16H 40/20 |
| 2009/0219131 A1 * | 9/2009 | Barnett | G16H 40/20 340/5.2 |
| 2012/0075464 A1 * | 3/2012 | Derenne | A61B 5/0013 348/135 |
| 2013/0290018 A1 * | 10/2013 | Anderson | G06Q 10/10 705/2 |
| 2016/0133119 A1 * | 5/2016 | Bone | G08B 21/245 340/691.6 |
| 2018/0047277 A1 | 2/2018 | Thyroff | |

OTHER PUBLICATIONS

Llorca et al., "A vision-based system for automatic hand washing quality assesment", Mar. 2011, Machine Vision and Applications (2011) 22:219-234.*

* cited by examiner

*Primary Examiner* — Iman K Kholdebarin
*Assistant Examiner* — Elisa M Rice
(74) *Attorney, Agent, or Firm* — Marsh Fischmann & Breyfogle LLP; Kent A. Lembke

(57) ABSTRACT

A method of monitoring a user performing a handwashing procedure, including: recognizing a user based upon biometric information obtained at a handwashing station, a user; detecting use of a component of the handwashing station; capturing image data of the user at the handwashing station; capturing data describing components and consumables used at the handwashing station; analyzing, using a processor, the image data; determining compliance with a handwashing procedure based at least in part on the analysis of the image data and the use of the component; and communicating compliance information. Other aspects are described and claimed.

20 Claims, 5 Drawing Sheets

SYSTEM AND METHOD FOR MONITORING PROCEDURE COMPLIANCE

BACKGROUND

Compliance with policies and procedures is often important to ensure health and safety for personnel as well as those many products and services related to the policies and procedures. For example, a company may have lab procedures to be followed when conducting experiments using biohazardous materials. Failure to follow the procedure may result in contamination, health risks to the personnel conducting the experiment and people who may come in contact with the user, compromise results, and other problematic scenarios.

In a specific example, in food handling processes in commercial kitchens, as well as in the medical industry, there is an inherent risk of spreading illness if employees do not follow proper procedures for hand sanitation, e.g., during food preparation, between patient visits, etc. There are mandatory requirements that should be followed for proper handwashing, often specific to the industry or context. However, to a large extent the state of the art relies solely upon employee training and hand written policies.

State of the art approaches for monitoring include identifying personnel who are assigned to perform a task together with operation of various tools used in the task performance. An employee badge can be used to determine whether assigned personnel are located in the vicinity of the required tools and serve as an indirect indicator that the assigned personnel used the tools to complete the task such as when a badge is detected near a handwashing station. However, this simply confirms presence and does not address actual compliance with a handwashing procedure. Furthermore, wearable identification devices such as badges can themselves be sources of contamination or other process compromise.

BRIEF SUMMARY

In summary, an embodiment provides a method of monitoring a user performing a handwashing procedure, comprising: recognizing a user based upon biometric information obtained at a handwashing station, a user; detecting use of a component of the handwashing station; capturing image data of the user at the handwashing station; capturing data describing components and consumables used at the handwashing station; analyzing, using a processor, the image data; determining compliance with a handwashing procedure based at least in part on the analysis of the image data and the use of the component; and communicating compliance information.

More generally, an embodiment provides a method for monitoring a user performing an operational process, comprising: recognizing the user and an operational process being performed by the user; ascertaining a task of the operational process to be performed by the user; and determining whether the user has complied with a compliance step, wherein the compliance step is to be completed prior to the performance of the task; wherein the determining comprises determining whether biometric data from the user has been obtained, wherein the biometric data is obtained using at least one biometric sensor operatively coupled to an object used in completing the compliance step.

Another aspect of the invention provides a system for monitoring a user performing an operational process, comprising: an electronic device that includes a processor; a memory device that stores instructions executable by the processor to: identify the user and an operational process being performed by the user; ascertain a task of the operational process to be performed by the user; and determine whether the user has complied with a compliance step, wherein the compliance step is to be completed prior to the performance of the task; wherein to determine comprises determining whether biometric data from the user has been obtained, wherein the biometric data is obtained using at least one biometric sensor operatively coupled to an object used in completing the compliance step.

Another embodiment provides a system for monitoring a user performing a handwashing procedure, comprising: a handwashing station; a biometric sensor that recognizes a user at the handwashing station; a component of the handwashing station that is required to be used during the handwashing procedure; an image sensor that captures image data of the user at the handwashing station; and a processor that: analyzes the image data; determines compliance with a handwashing procedure based at least in part on the analysis of the image data and use of the component; and thereafter communicates compliance information.

A further embodiment provides a method for monitoring a user performing an operational process, comprising: identifying the user and an operational process being performed by the user; ascertaining a task of the operational process to be performed by the user; and determining whether the user has complied with a compliance step, wherein the compliance step is to be completed prior to the performance of the task; wherein the determining comprises determining whether biometric data from the user has been obtained, wherein the biometric data is obtained using at least one biometric sensor operatively coupled to an object used in completing the compliance step.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings.

The scope of the embodiments will be pointed out in the appended claims.

DETAILED DESCRIPTION

Figure 1:
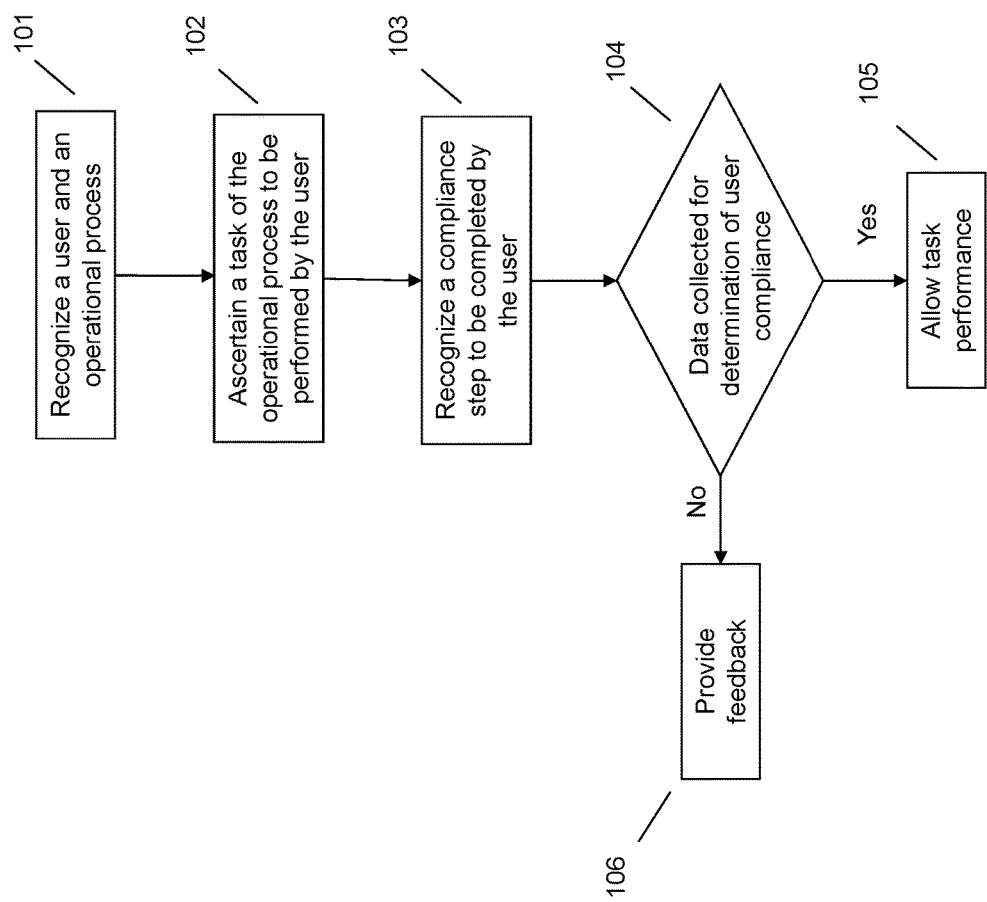
FIG. 1 illustrates an example method for monitoring performance of an operational process.

Policies and procedures include tasks that are considered critical control points or tasks that must be completed to ensure desired task performance. Examples of critical control points or tasks may include standards for access to sensitive areas, proper qualifications to handle particular chemicals, security clearances, proper cleanliness, and the like. In some cases, when the employee or user performing the operational process fails to comply with the requirements of the critical control point or task, the user should not move to the next task in the operational process.

However, ensuring that employees or users follow the policies and procedures, especially critical compliance steps, is difficult. Current methods rely on training the employees and users regarding the policy and procedures. The current methods rely heavily on written procedures, training, and relying on personnel to read and follow the procedures. Thus, current methods rely on self-discipline and self-policing of employees and users tasked with operational processes, particularly critical compliance steps. Even with exceptional training and personnel compliance efforts continuous compliance improvement is desirable.

Some current systems integrate electronic transmitters and receivers (e.g., radio frequency identification (RFID) tags, near field communication devices, etc.) to determine if a user or employee has been near a location related to the compliance step. For example, an employee badge may include an RFID tag that can recognize when the employee is in the same vicinity of a hand wash station. However, such techniques only indicate whether the user is close to a location associated with the compliance step. These techniques do not indicate whether the user actually completed the compliance step. Using the example above, the RFID tag cannot recognize that the employee actually washed his/her hands.

Accordingly, an embodiment provides a method for monitoring a user performing an operational process and the user's compliance with critical steps within the operational process. An embodiment recognizes a user and an operational process to be performed by the user. Recognizing the user may include recognizing the specific user (e.g., the user is "John," the user is "Employee 5," etc.), recognizing a category or role of the user (e.g., chef, lab technician, etc.), and the like. The operational process may be a task or group of tasks that need to be completed to perform an overall operation. For example, the operational process may include preparing a particular meal which involves both safety processes as well as processes that involve selecting and preparing ingredients according to a recipe.

The system may ascertain a task of the operational process to be performed by the user. Using the meal preparation example above, one of the tasks that the user has not performed yet may be marinating chicken. An embodiment may determine whether the user has completed a compliance step that is to be completed before the user performs the ascertained task. The compliance step includes the user washing his/her hands for a specified period of time, with specified cleaning agent at a specified water temperature before moving to the step after marinating the chicken. In one embodiment, determining whether the user has completed the compliance step includes obtaining biometric information and/or sensed information when the user is using an object or tool, and sensed information about consumable products used to complete the compliance step. The biometric data may be obtained from a biometric sensor that is selected and configured to avoid interference with the operational process being monitored such as a non-contact or minimal contact biometric sensor, palm/fingerprint reader and the like located at a sink of a handwashing station. When the user places his/her hands under the water flow while washing his/her hands, the biometric sensor may sense biometric information from the user's hands, arms and gestures, for example. As the user performs the compliance step, the biometric information can be used to determine whether the user is completing the compliance step and also whether the user is completing the compliance step in accordance with the procedure.

Additionally, an embodiment provides feedback to the user while the user is performing the compliance step or after the user has completed the compliance step. For example, if the user stops washing his/her hands before the prescribed length of time for doing such has elapsed, the system may provide an audio or visual signal to the user indicating that the user should continue to wash his/her hands.

In particular circumstances the biometric information can assist the user in completing the task. For example, it may be difficult for a user to visually detect that they have washed all surfaces of a tool or that the surfaces have reached a desired temperature uniformly. An embodiment provides visual feedback by recording video, thermal, chemical, bacterial, or other appropriate imaging while the user performs the compliance step, and may then provide visual feedback to the user. Other information gathered during compliance monitoring can also assist the user, such as monitoring use of consumables to ensure that sufficient cleaning product of a suitable kind was used. Thus, as described herein, monitoring performance and completion of compliance steps is enhanced using biometric information.

Now referring to FIG. 1, a user and an operational process being performed by the user is recognized at 101. Operation 101 may involve recognition of the particular user (e.g., "Steve," "Employee 7," etc.), recognition of the category of user (e.g., chef, lab technician, doctor, scientist, etc.), recognition of the location of the user (e.g., user assigned to the kitchen, user assigned to a surgery room, etc.), and the like. User recognition may involve an identification object such as RFID tags, employee badges with visual indicia, wristbands, barcodes, mobile devices of a user, and the like. For example, an employee may have to swipe his/her badge when entering a secure area. To recognize a specific user, the identification objects are associated with the specific user. For example, the user may wear a wristband that transmits a unique code associated with the specific user. Alternatively, the user may only be recognized by category, role or type. For example, the user may be recognized as a food worker, lab assistant, technician or the like through the use of a barcode that is scanned and only identifies the user's role.

An operational process may include a task or series of tasks that need to be performed to complete the operational process. For example, an operational process may include performing an experiment, preparing a meal, performing a medical procedure, and the like. In other words, an operational process may include any process or procedure that requires a user to perform actions or tasks to complete. The operational process may then be broken into different tasks. Using the experiment example above, sample tasks may include donning the proper attire, washing hands, opening a vial containing biological material, adding a substance to the material, closing the vial, and washing hands and equipment with a particular cleaning agent to ensure the biological material is not present outside of its containing vial.

To identify the operational process, an embodiment may access a database or data store having previously stored information. The previously stored information may include information about the user and the operational process that the user is to perform. For example, if the user has been recognized as a chef, the system may identify the operational process(es) associated with being a chef. As another example, if the user is recognized as a lab technician, the system may identify the operational process(es) associated with being a lab technician. If the system recognizes the specific user, the database or data store may include information specific to that user and tasks to be performed by the specific user.

In one embodiment, identification of the operational process may occur or be enhanced at operation 101 through use of an object worn on the body of the user. As the user moves from one location to another, the object may allow the user's location to be determined. Based upon a previous and current location of the user, an embodiment may determine the operational process that the user is completing. For example, assume that the user is a surgeon who is determined to be walking down a particular hallway of a surgical wing in the hospital. When the system determines that the surgeon has entered a washing station outside a surgerical room (e.g., via the surgeon swiping his/her badge at the washing station door), the system may imply that the surgeon is likely going to be performing a surgery.

The identification of the operational process may be enhanced using additional information which may be accessible to or by the system. Using the example of the surgeon, the system may access the calendar of the surgeon and use the calendar to confirm that the surgeon is scheduled for a surgery. Other information may be accessed or used by the system, for example, location maps, communication messages (i.e., phone calls, emails, text messages, social media posts, etc.), user schedules, location schedules (e.g., experiments or processes being conducted at a location, access times, employee schedules at that location, etc.), badge or other identification object information, and the like.

At operation 102 an embodiment may ascertain a task of the operational process that is to be performed by the user. The tasks of the operational process may be identified in a manner similar to those in connection with identifying the operational process. For example, a wearable device allows the system to locate the user near a prepping station in a kitchen. Since the system has already determined that the user is performing the operational process of preparing a meal containing chicken, the system may ascertain that the user is about to perform the task of preparing the vegetables for the meal. The system may track the user's location over time in the preparation area such that even though the operational process includes multiple tasks that require use of the prepping station, the system knows that the user has previously accessed the prepping station two times and when the user accesses the prepping station for the third time, the user is performing the task of preparing the vegetables. In other words, ascertaining the task may include inferences and additional monitoring by the system.

Based on the identified task to be performed the system may identify a compliance step to be performed before starting and/or before completion of the identified task at 103. Unlike static written procedures, real time monitoring enables tasks to be dynamically identified in operation 103 based on emerging events that are sensed during the operation. As an example, if a surgeon leaves the surgical room during a surgery, before reentering the surgical room, the surgeon may be required to rewash his/her hands. However, the static written procedure for the surgery may not include that particular compliance step, because the procedure for the surgery was written assuming that the surgeon would not leave the room during a surgery. Thus, identification of the compliance step in 103 may be based upon a different policy or procedure that is dynamically determined. For example, a company may have a policy that states anytime a user leaves a food prepping area, the user has to wash his/her hands before re-entering the food prepping area or that when a knife is sharpened mid-procedure it must be sterilized before use.

The system may then determine, at 104, whether the user has satisfactorily completed the compliance step. This determination may include evaluating biometric data associated with the user, environmental sensors, timers and the like. Examples of biometric data may include fingerprints, retina scans, DNA, images, and the like, that are capable of acquiring unique recognition of a user within the context of the procedure being monitored. As an example, a fingerprint sensor may be located at a sink in a handwashing station. The system may collect more than one type of biometric data. For example, a handwashing station may be equipped with both a fingerprint sensor and gesture recognition device such as a video image sensor. The fingerprint sensor may be used to identify the user who is performing the step and the image sensor may be used to determine if the user complied with all the requirements of the compliance step.

To determine whether a user has complied with the compliance step, an embodiment may match the obtained biometric and environmental data with a database or data store containing conditions to be satisfied. For example, the system may compare the biometric data obtained using the fingerprint sensor located at the soap dispenser to a database to match the user stored information and recognize which user is completing the compliance step. The system may then identify whether the operational process required the user to perform the compliance step. If the operational process included the compliance step, the system may note that the user performed the compliance step.

The compliance step performance may be evaluated against established criteria such as time, temperature, cleaning agents, and the like, that would be required for a particular compliance task. The compliance step may have different requirements or operations associated with it. For example, the compliance step may require that the user perform the step for a predetermined length of time, that the user uses a particular object or consumable during completion of the compliance step, that the user perform different operations during completion of the compliance step, and the like. For example, the compliance step may require that the user wash his/her hands for a prescribed length of time. As another example, the compliance step may require that the user use a particular type of soap or other consumable to kill particular kinds of bacteria. As another example, the compliance step may require that the user scrubs his/her hands with a particular device and thoroughly washes both sides of his/her hands. Determining compliance with all the requirements may be completed using similar methods as determining compliance with the compliance step. For example, each of the objects and/or consumables that a user has to use to comply with the requirements of the compliance step may have biometric sensors. As another example, images may capture the user during completion of the compliance step to identify whether the user has complied with the requirements of the compliance step.

When the system determines that the user has complied with the compliance step at 104, an embodiment may allow the user to progress to the next step of the operational process at 105. If, however, the system determines that the user has not complied with the compliance step at 104, an embodiment may provide feedback to the user at 106. For example, the system may notify the user that they have not completed all requirements of the compliance step. As an example, the system may provide an audio notification (e.g., voice, buzzer, beep, etc.) that indicates the user has not completed all operations of the compliance step. As another example, the user may provide a visual notification (e.g., blinking light, video, pop-up display, etc.) that indicates the user has not completed all the operations of the compliance step. Although not illustrated, feedback operation 106 may also be included together with operation 105 to provide positive indication of compliance.

If the user has partially complied with requirements of the compliance step, but not all the operations of the compliance step, the feedback may be based upon the user's degree of compliance with the compliance step. As an example, if the compliance step requires the user to wash his/her hands for sixty seconds, but the user only washes his/her hands for forty-five seconds, the feedback may include notifying the user that he/she needs to wash his/her hands for an additional fifteen seconds.

Feedback may occur during completion of the compliance step, as per the example above, or may additionally, or alternatively, occur after completion of the compliance step. For example, an embodiment may capture images of the user completing the compliance step. Additionally, the images may be analyzed, edited and additional feedback may be provided with the images. For example, the system may compare the video of the user completing the compliance step with an exemplary video of how the compliance step should be completed. The system may identify differences between the two videos and augment the video (e.g., making marks on a video frame, adding audio commentary to the video, etc.) with the necessary feedback.

Feedback may also include preventing the user from progressing to the next step of the operational process. For example, if the system determines that a lab technician has failed to comply with a compliance step of disposing of lab gear that may have been contaminated or damaged, the system may prevent the user from leaving the secure area by preventing operation of the door. The system may also provide feedback on why the user cannot progress to the next step. As another example, if a surgeon has not complied with all the requirements for washing his/her hands before performing a surgery, the surgeon may be unable to enter the surgical room. As another example, if the system has identified that a chef has not washed his/her hands, the system may prevent access to food items.

Although discussed in the context that the user has not complied with all the operations of the compliance step, it should be understood that feedback may also be provided if the user has complied with all operations of the compliance step. For example, the system may provide feedback to the user that they have complied with all the requirements of the compliance step. Additionally, feedback may be provided even if the system has not made a determination of whether the user complied with the operations of the compliance step. For example, the system may not determine if the user has complied with the requirements of the compliance steps while the user is performing the operational process. Rather, the determination of compliance may be determined at a later time, for example, after review of video documentation. However, feedback may still be provided while the user is performing a compliance step. For example, if the user is to wash his/her hands for a prescribed length of time, the system may provide a buzzer when the prescribed length of time has elapsed. However, the system may not determine if the user used the correct soap until a later time.

Figure 2:
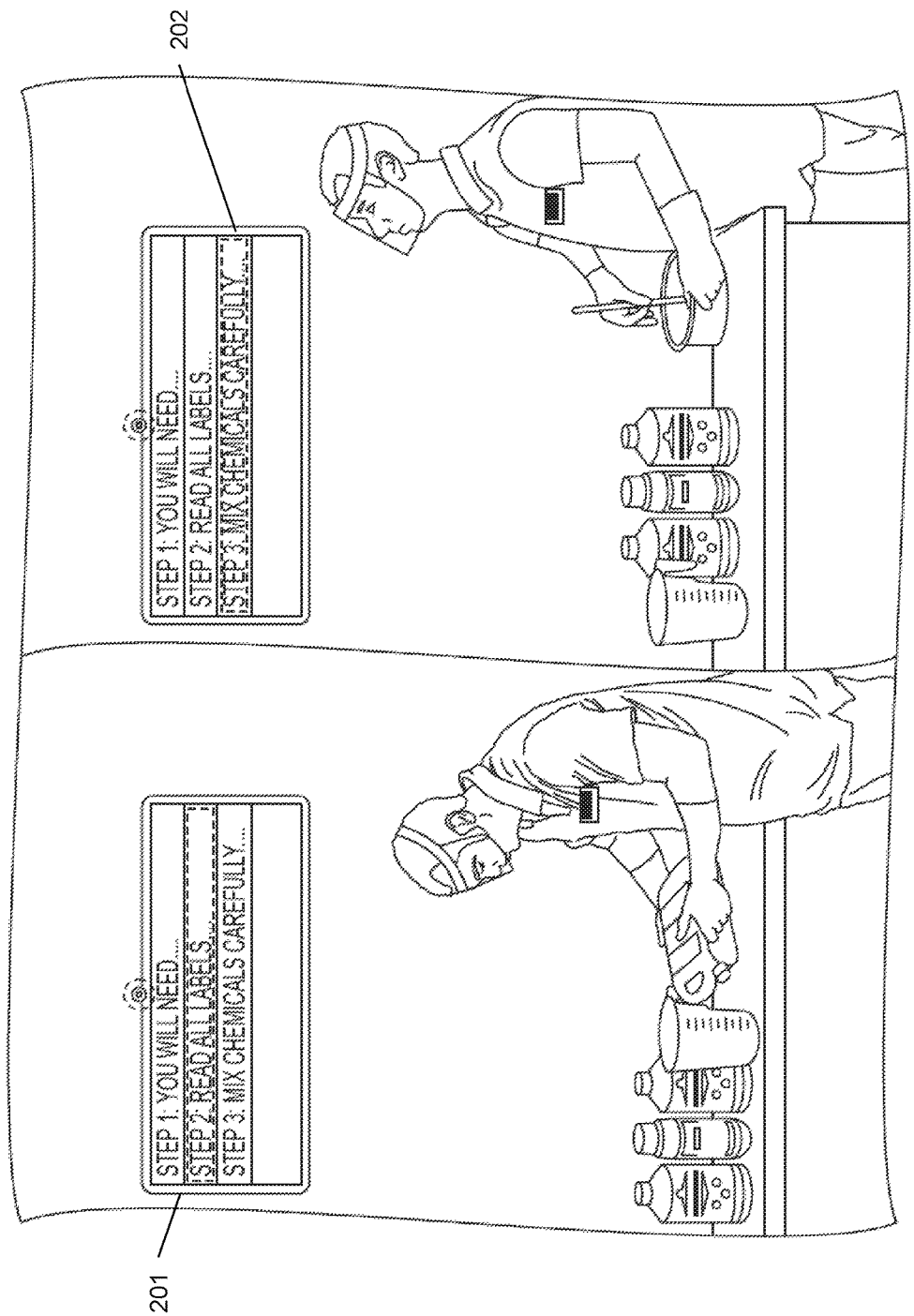
FIG. 2 illustrates an example of providing feedback to a user based upon compliance with a step in an operational process.

FIG. 2 illustrates an example of additional feedback that may be provided by the system. As the system determines the user has complied with a step 201, the system may update an instruction board, verbal instruction recording, and the like, to the next step in the process as shown at 202. Thus, the system may provide feedback in allowing or prompting the user to proceed to the next step in the procedure.

Certain embodiments are specifically useful in operating commercial kitchens and food preparation areas. A problem with state of the art techniques that use electronic transmitters and receivers (e.g., radio frequency identification (RFID) tags, near field communication devices, etc.) to determine if a user or employee has been near a location related to a procedure, e.g., is present at a handwashing station, is that these techniques only recognize whether the user is close to a location required for compliance. These techniques do not recognize whether the user actually completed the handwashing procedure. A handwashing procedure may include a user washing his/her hands or another procedure that requires a user to wash something by hand (e.g., washing food products, washing dishes, washing utensils, washing cutting boards, washing medical equipment, washing dental equipment, washing laboratory equipment, washing food processing equipment, washing parts, etc.). For example, using an RFID tag cannot identify that the employee actually washed his/her hands using the appropriate soap or hand sanitizer, for a preferred amount of time, and the like. Moreover, wearable devices can themselves lead to contamination in some working environments as the surfaces of the device may carry contaminants.

Figure 3:
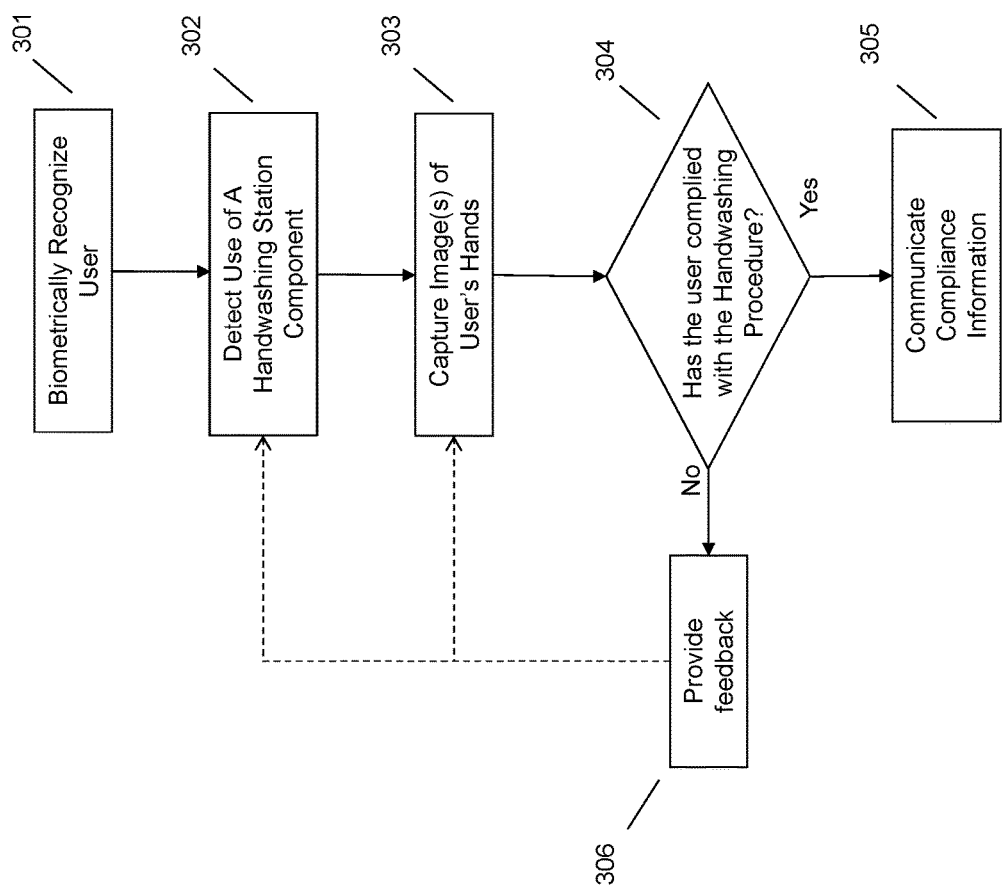
FIG. 3 illustrates an example system implementing a specific instance of the method of FIG. 1 for monitoring a user performing a handwashing procedure.

Accordingly, as a more specific example for monitoring if user complied with an operational step, an embodiment provides a method for monitoring a user performing a handwashing procedure and evaluating the user's compliance with predetermined steps required by the handwashing procedure. Referring now to FIG. 3, at 301, an embodiment recognizes a user, for example, as explained in connection with 101 of FIG. 1, e.g., using biometric data such as fingerprint data, image data, clothing recognition, and the like, without the need to employ a device such as an identification badge having an RFID device therein. It is worth noting that different users may have to perform different handwashing procedures. Thus, an embodiment chooses a particular handwashing procedure or protocol dependent upon the user that is biometrically recognized.

At 302 and 303 an embodiment also determines if specific tasks necessary for compliance with a handwashing procedure have been performed by the user, for example, using similar techniques as described in connection with 104 of FIG. 1. The system may determine if the specific tasks have been performed by evaluating data captured during the handwashing procedure, e.g., image data from an image sensor directed at the user's hands is employed by an embodiment to capture images of the user's hands as he or she performs the handwashing procedure for comparison against expected image data, for example at 303. This permits an analysis, e.g., by comparison of image analysis data of the user's hands in the images with expected data that conforms to handwashing procedure compliance.

Additionally, at 302, an embodiment also provides a determination if certain components, e.g., a water faucet, a liquid hand sanitizer, cleaning product dispenser, etc., have been used at appropriate times or for an appropriate duration by the user during the handwashing procedure. In an embodiment, this data is combined with image analysis data to ensure compliance with a predetermined handwashing procedure.

At 304, an embodiment determines if the user complied with the handwashing procedure. Compliance with the handwashing procedure can be determined using techniques as described in connection with 104 of FIG. 1. For example, an embodiment determines, e.g., via an image analysis algorithm that compares the image data of the user's hands to an expected pattern of movement for a given handwashing procedure, if the user has complied with a predetermined handwashing procedure at 304. As described herein, the determination made at 304 may take into account other data, e.g., the user's operation of a component of the handwashing station, the order in which components of the handwashing station are utilized, the duration of time that the components are utilized, etc. The type of monitoring data that is used to make the determination at 304 is influenced by the handwashing procedure used for comparison.

Additionally, an embodiment provides feedback to the user at 305 and 306, e.g., while the user is performing the handwashing procedure or after the user has completed the handwashing procedure. For example, if the user stops washing his/her hands before the prescribed length of time has elapsed, the system provides audio or visual output to the user indicating that the user should continue to wash his or her hands, for example at 306.

An embodiment also provides feedback in the form of compliance data at 305. For example, an embodiment provides compliance data to another user, e.g., to a mobile device of a manager or a supervisor, to a remote database, etc., such that another user is aware that handwashing procedures are being complied with. An advantage of this feature is that the remote database maintains an auditable record of compliance that can be used for training, issue investigation and other purposes. An embodiment provides anonymous compliance data, e.g., as a statistic of overall compliance for a period (e.g., percentage of employee handwashing compliance per day, week, month, etc.). An embodiment may provide anonymous compliance data in the form of numerical data, image data, or video data.

If the user has not complied with the handwashing procedure, as determined at 304, an embodiment may offer feedback, e.g., a corrective instruction, as indicated at 306. This may require the user to re-perform certain steps in the handwashing procedure prior to being given an indication that compliance has been achieved, as indicated by the dashed arrows in FIG. 3. An embodiment includes feedback data in the communication of the compliance information, e.g., noting that a user had to re-perform a particular step in the handwashing procedure.

The illustrated example embodiments will be best understood by reference to the figures. The following description is intended only by way of example, and simply illustrates certain example embodiments.

Figure 4:
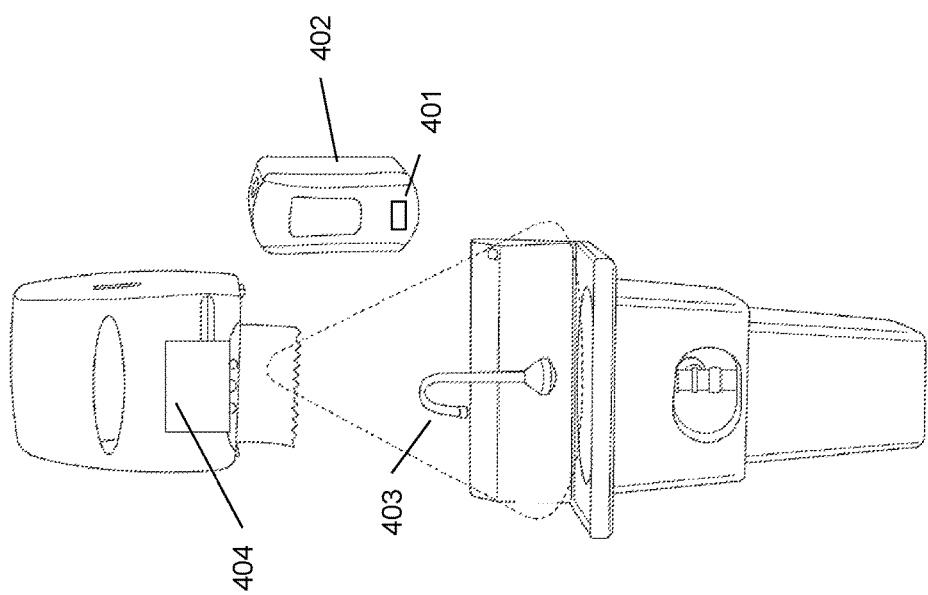
FIG. 4 illustrates an example of monitoring a user for compliance with a handwashing procedure.

As illustrated in FIG. 4, a system according to an embodiment includes a biometric sensor 401. The biometric sensor 401 captures data (e.g., fingerprint data, anterior/posterior hand data, subsurface vein pattern, etc.) and permits recognition of a user that is proximate to or touching a system component, here a liquid soap dispenser 402. A biometric sensor 401 collects biometric information prior to operating a handwashing station component (e.g., water faucet 403, soap dispenser 402, etc.). This permits positive user recognition without the need for the user to carry or wear another device (e.g., RFID bracelet or badge).

After a user is recognized, an embodiment monitors the user's operation of the handwashing station components to ensure compliance with a predetermined handwashing procedure or protocol. For example, an embodiment collects monitoring data for comparison to expected data of a preferred, predetermined handwashing procedure. The handwashing procedure may be selected based on the biometric identification of the users, i.e., different users may be required to comply with different handwashing procedures.

The comparison of the monitoring data with a predetermined handwashing protocol may be simple or more complex. By way of example, an embodiment detects if a soap dispenser 402 and a water faucet 403 are utilized, in which order, and for how long and compares this data against an pre-established series of events.

The monitoring data may be collected in a variety of ways. For example, sensors may be disposed within the soap dispenser 402 and water faucet 403 in order to detect their use and the duration thereof. As another example, if an electronically activated soap dispenser 402 or water faucet 403 are employed, the activation signals may be counted to collect monitoring data.

An embodiment includes an image sensor 404 that is positioned to view the user's hands while they perform the handwashing procedure. In FIG. 4, the field of the image sensor's view is indicated generally with a dashed line. In one embodiment, the image sensor 404 is a video image sensor. Image data from the image sensor 404 is provided to a processor that executes a program to compare the image data from the image sensor 404 to expected image data of a preferred handwashing technique. In an embodiment, the expected data includes simply detecting periodic movement of the user's hands in the image data for an established amount of time. In another embodiment an image analysis algorithm may compute how many times and/or how often a user places one hand on top of the other in the image data collected from the image sensor 404. In an embodiment, the image analysis algorithm computes how often or for what duration the user contacts the water from the water faucet 403.

The image analysis performed by an embodiment is combined with other data such as water temperature, water flow rate and the like to evaluate compliance with a preferred handwashing procedure. For example, a processor executes a program of instructions that calculates a compliance score on the basis of the image analysis, the use of required components (e.g., soap dispenser 402, water faucet 403, etc.), the order of usage, the duration of usage, etc. The compliance score indicates whether a user has exceeded one or more predetermined compliance threshold(s). As another example, the compliance score indicates which, if any, part of the handwashing procedure was not complied with. In an embodiment, the compliance score is communicated to another device, e.g., to a remote database, to a mobile computing device, etc.

An embodiment provides feedback to the user, e.g., during the handwashing procedure. For example, a visual indicator (e.g., a display screen, LEDs, etc.) is included in an embodiment to display an indication that a correct handwashing technique is or is not being performed by the user. In an embodiment, in response to detecting that a user has not followed a preferred handwashing technique, an instructive display is given, e.g., a video demonstrating correct handwashing technique. The feedback is provided by an embodiment in one or more forms, e.g., audio feedback, visual feedback, communication of a compliance score, etc.

Figure 5:
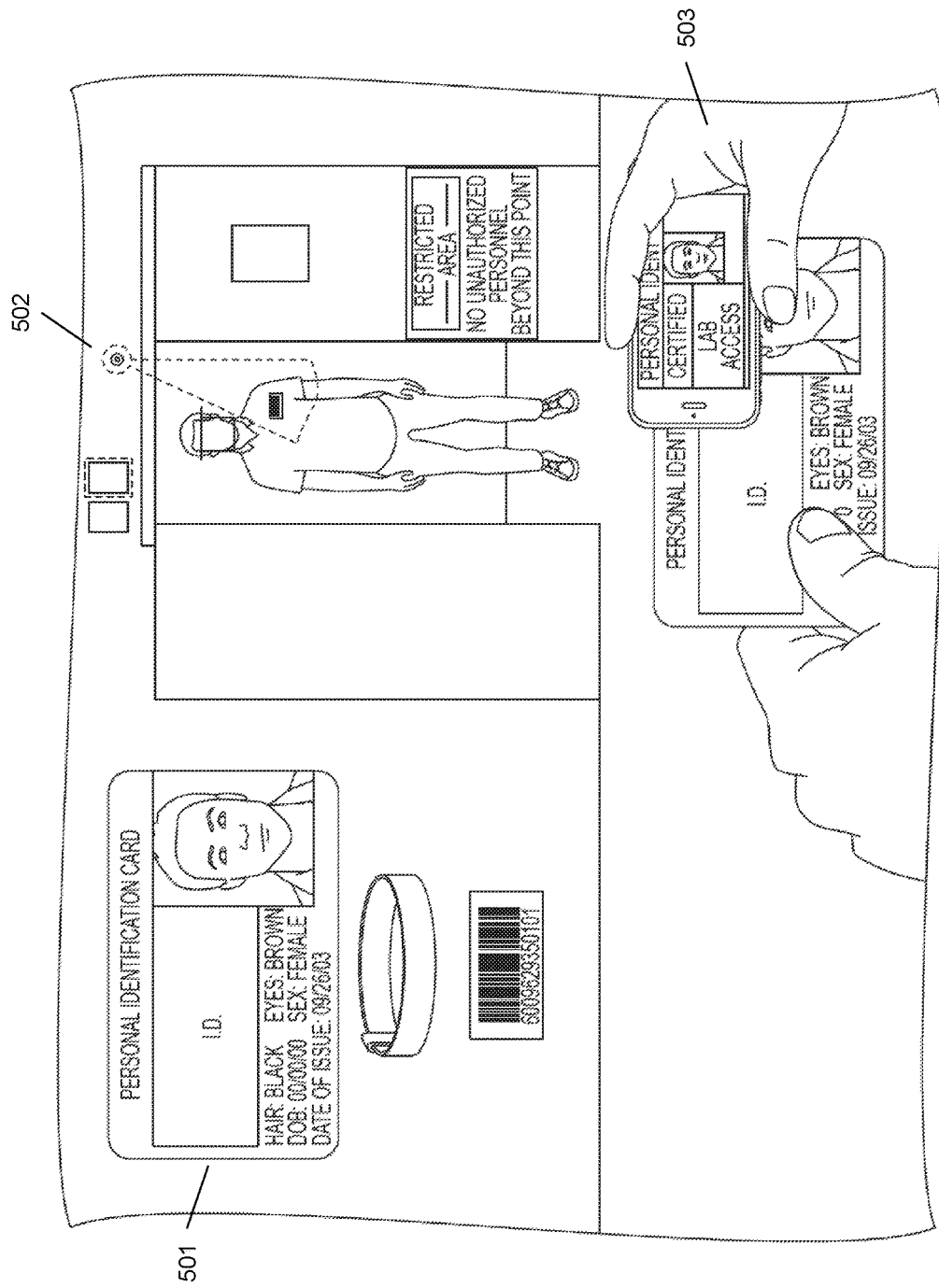
FIG. 5 illustrates an example of allowing a user into a restricted area based upon compliance with access procedures.

As another example of monitoring a user performing an operational process and with reference to FIG. 5, the system as described herein can be used to determine if a user 503 has access to a restricted area 502. Using an identification object 501 (e.g., employee badge, barcode, identification bracelet, etc.), the system can recognize the user 503. Upon the user 503 entering a restricted area 502, the system may scan the identification object 501 and determine if the user 503 is allowed to access the restricted area 502. Whether the user 503 may enter the restricted area 502 may be included in a database and associated with the identification object 501.

It should be noted that the various functions described herein may be implemented using instructions stored on a device readable storage medium such as a non-signal storage device that are executed by a processor. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device.

In some cases, the devices or components referred to herein communicate by a connection facilitated through network, e.g., a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method of monitoring a user performing a handwashing procedure, comprising:
    identifying an operational process being performed by a user, wherein the operational process comprises a plurality of tasks to be performed in a predetermined sequence, one of the plurality of tasks comprising a handwashing task to occur before occurrence of another of the plurality of tasks;
    for the handwashing task:
        recognizing a user based upon biometric information obtained, using a biometric sensor located at a handwashing station that obtains the biometric information from a hand of the user, at the handwashing station;
        detecting use of a component of the handwashing station using one or more sensors disposed within the component, wherein the component is a predetermined component specified within the handwashing task;
        capturing, using an image sensor, image data of the user at the handwashing station;
        capturing data describing components and consumables used at the handwashing station;
        analyzing, using a processor, the image data, wherein the analyzing comprises identifying actions taken by the user at the handwashing station and comparing the image data to expected image data of a handwashing technique and computing a compliance score based upon the comparison, wherein the compliance score is further based upon a match between the component and the predetermined component specified within the handwashing task and is further based upon the handwashing task occurring at the sequence point within the predetermined sequence of the plurality of tasks and before the occurrence of another of the plurality of tasks; and
        determining compliance with a handwashing procedure based at least in part on the analysis of the image data and the use of the component, wherein the determining compliance comprises determining if the computed compliance score has exceeded a predetermined compliance threshold; and
    communicating compliance information based upon the compliance with the handwashing procedure and compliance with the operational process.

2. The method of claim 1, wherein the identifying comprises using biometric data selected from the group consisting of a fingerprint data, subsurface vein map data, and image data.

3. The method of claim 1, wherein the detecting comprises detecting water flow.

4. The method of claim 3, wherein the detecting water flow comprises detecting water flow for at least a predetermined amount of time.

5. The method of claim 1, wherein the detecting comprises detecting washing fluid has been dispensed.

6. The method of claim 1, further comprising ascertaining a specific task of the handwashing procedure to be performed by the user;
    wherein the determining comprises comparing data of the analysis of the image data to expected data for the specific task.

7. The method according to claim 1, further comprising providing feedback to the user, wherein the feedback is associated with compliance with a handwashing procedure.

8. The method according to claim 7, wherein the feedback is provided during performance of the handwashing procedure.

9. The method of claim 1, wherein the compliance information is communicated to a mobile device.

10. The method of claim 1, wherein the handwashing procedure comprises a washing procedure performed by hand selected from the group consisting of: washing food products, washing dishes, washing medical equipment, washing laboratory equipment, and washing food processing equipment.

11. A system for monitoring a user performing a handwashing procedure, comprising:
a handwashing station;
a biometric sensor that recognizes a user at the handwashing station by capturing biometric information from a hand of the user;
a component of the handwashing station that is required to be used during the handwashing procedure, wherein the component comprises one or more sensors disposed within the component that detect use of the component, wherein the component is a predetermined component specified within a handwashing task of an operational process, wherein the operational process comprises a plurality of tasks to be performed in a predetermined sequence, one of the plurality of tasks comprising a handwashing task to occur before occurrence of another of the plurality of tasks;
an image sensor that captures image data of the user at the handwashing station; and
a processor that:
identifies the operational process being performed by a user;
for the handwashing task:
analyzes the image data, wherein the analyzing comprises identifying actions taken by the user at the handwashing station and comparing the image data to expected image data of a handwashing technique and computing a compliance score based upon the comparison, wherein the compliance score is further based upon a match between the component and the predetermined component specified within the handwashing task and is further based upon the handwashing task occurring at the sequence point within the predetermined sequence of the plurality of tasks and before the occurrence of another of the plurality of tasks; and
determines compliance with a handwashing procedure based at least in part on the analysis of the image data and use of the component, wherein the determining compliance comprises determining if the computed compliance score has exceeded a predetermined compliance threshold; and
thereafter communicates compliance information based upon the compliance with the handwashing procedure and compliance with the operational process.

12. The system of claim 11, wherein the biometric sensor is selected from the group consisting of a fingerprint reader and the image sensor.

13. The system of claim 11, wherein the component of the handwashing station comprises a faucet.

14. The system of claim 13, wherein the processor determines that water flows from the faucet for at least a predetermined amount of time.

15. The system of claim 11, wherein the component of the handwashing station comprises a washing fluid dispenser.

16. The system of claim 11, wherein the processor ascertains a specific task of the handwashing procedure to be performed by the user;
wherein the processor determines compliance by comparing data of the analysis of the image data to expected data for the specific task.

17. The system according to claim 11, wherein the processor provides feedback to the user, wherein the feedback is associated with compliance with a handwashing procedure.

18. The system according to claim 17, wherein the feedback is provided during performance of the handwashing procedure.

19. The system of claim 17, wherein the feedback is selected from the group consisting of predetermined audio and predetermined video.

20. A method for monitoring a user performing an operational process, comprising:
identifying the user and an operational process being performed by the user, wherein the operational process comprises a plurality of tasks to be performed in a predetermined sequence, one of the plurality of tasks comprising a compliance step to occur before occurrence of another of the plurality of tasks, wherein the identifying the user comprises obtaining biometric information of the user using a biometric sensor located at a handwashing station that obtains the biometric information from a hand of the user;
ascertaining the user is to perform the another of the plurality of tasks; and
determining whether the user has complied with the compliance step before performance of the another of the plurality of tasks, wherein the determining comprises capturing image data of the user performing the compliance step, identifying actions taken by the user during performance of the compliance step, comparing the image data to expected image data of performance of an expected compliance step and computing a compliance score based upon the comparison, and determining if the computed compliance score has exceeded a predetermined compliance threshold, wherein the compliance score is further based upon the compliance step occurring at the sequence point within the predetermined sequence of the plurality of tasks and before the occurrence of the another of the plurality of tasks;
wherein the determining comprises determining whether biometric data from the user has been obtained, wherein the biometric data is obtained using at least one biometric sensor operatively coupled to an object used in completing the compliance step, wherein the object is a predetermined component specified within the compliance step, and wherein the compliance score is further based upon a match between the object and a predetermined object specified within the compliance step.

* * * * *